Figure 1:
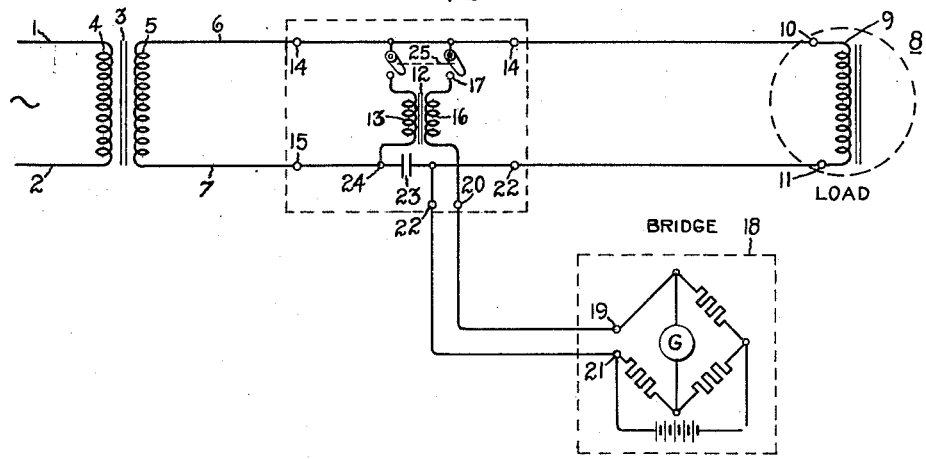

Dec. 11, 1951 R. E. SEELY 2,578,455
CIRCUIT FOR MEASURING THE RESISTANCE OF ENERGIZED
ALTERNATING CURRENT APPARATUS
Filed July 26, 1949 2 SHEETS—SHEET 1

Inventor:
Richard E. Seely,
by *Prowell S Mark*
His Attorney.

Dec. 11, 1951  R. E. SEELY  2,578,455
CIRCUIT FOR MEASURING THE RESISTANCE OF ENERGIZED
ALTERNATING CURRENT APPARATUS
Filed July 26, 1949  2 SHEETS—SHEET 2
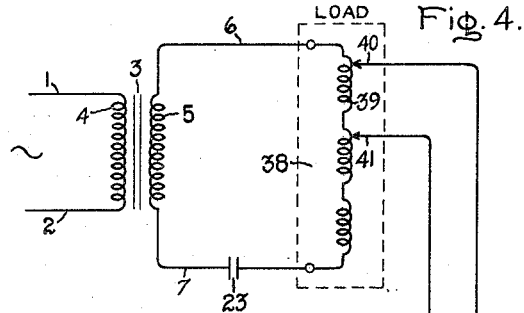
Fig. 4.
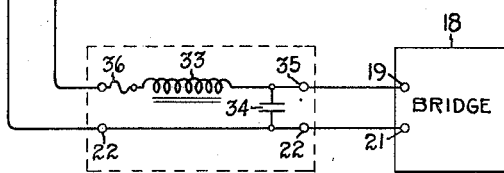
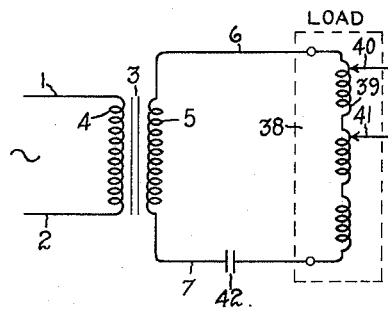
Fig. 5.
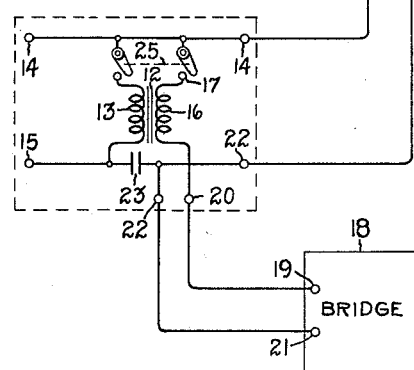
Inventor:
Richard E. Seely,
by *Prowell P. Mack*
His Attorney.

Patented Dec. 11, 1951

2,578,455

UNITED STATES PATENT OFFICE 2,578,455

CIRCUIT FOR MEASURING THE RESISTANCE OF ENERGIZED ALTERNATING CURRENT APPARATUS

Richard E. Seely, Fort Wayne, Ind., assignor to General Electric Company, a corporation of New York Application July 26, 1949, Serial No. 106,935

7 Claims. (Cl. 175—183)

1

This invention relates to resistance measuring devices and more specifically to means for measuring the resistance of energized alternating current apparatus.

It is frequently desirable to measure the electrical resistance of an alternating current energized winding, such as a transformer winding or a motor stator winding, without deenergizing the winding. This resistance measurement of an alternating current energized winding is especially desirable in order to determine the winding temperature. In the past, it has been necessary to measure the winding resistance after the winding has been deenergized which involves the necessity of securing a number of resistance readings at various time intervals after shutdown and the extrapolation of these readings back to zero time in order to ascertain the approximate resistance of the winding at shutdown.

An object of this invention is to provide means for continuously measuring the resistance of alternating current energized apparatus.

Another object of this invention is to provide means for continuously measuring the resistance of alternating current energized conductors or windings into which power is flowing.

A further object of this invention is to provide means for continuously measuring the resistance of alternating current energized conductors or windings from which power is flowing.

Further objects and advantages of this invention will become apparent and the invention will be better understood from the following description referring to the accompanying drawings, and the features of novelty which characterize the invention will be pointed out with particularity in the claims annexed to and forming part of this specification.

In accordance with one aspect of this invention, a transformer is provided having its primary winding connected across the line which energizes the apparatus, the resistance of which is to be measured, and its secondary winding having one end connected to one side of the apparatus. The transformer is arranged so that a voltage substantially equal to the voltage across the apparatus is developed across the secondary winding. A Wheatstone bridge or other resistance measuring device is arranged with one terminal connected to the other end of the transformer secondary winding and another terminal connected to the other side of the apparatus. The secondary winding of the transformer is connected so that the voltage developed thereacross is substantially 180° out of phase with the volt-

2 age across the apparatus with respect to the circuit comprising the transformer secondary, the apparatus and bridge, whereby substantially no alternating current voltage appears across the bridge. A capacitor is arranged in series with the apparatus in order to block direct current from the transformer primary winding and the circuit to which the apparatus is connected so that the bridge measures only the resistance of the apparatus and the known resistance of the transformer secondary winding. In accordance with a further aspect of this invention, a low pass filter comprising a series arranged reactor and capacitor is substituted for the transformer, the filter being arranged so that its resonant frequency is substantially different from the frequency of the alternating current voltage impressed on the apparatus. The bridge has one terminal connected at a point between the reactor and the filter capacitor and another terminal to the other side of the apparatus. A blocking capacitor is arranged in series with the apparatus so that the bridge measures only the resistance of the apparatus and the known resistance of the reactor.

Figure 2:
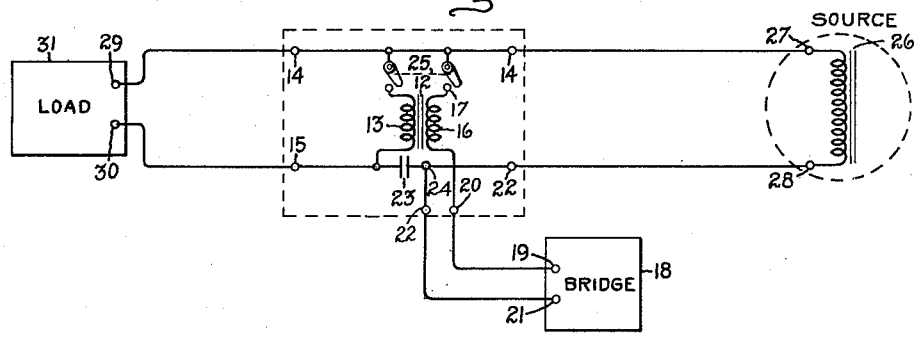
Figure 3:
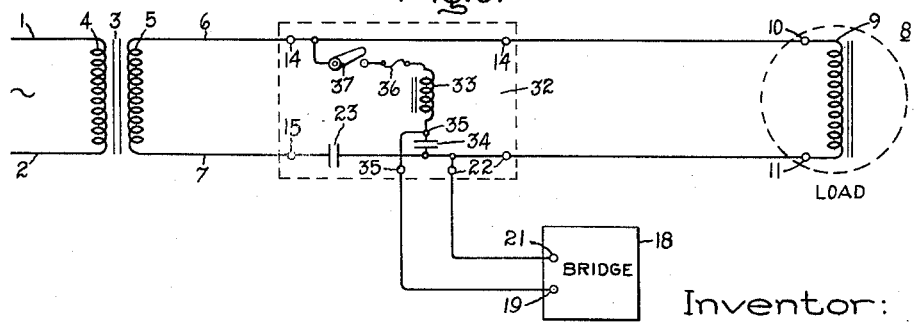

In the drawing, Fig. 1 is a schematic illustration of the circuit of this invention for measuring the resistance of a load winding such as a motor stator winding; Fig. 2 is a schematic illustration of the circuit of this invention applied to measure the resistance of a source winding such as an alternator or the secondary winding of a transformer; Fig. 3 is a schematic illustration of a modification of this invention utilizing a filter; Fig. 4 illustrates the application of the circuit of Fig. 3 to measure the resistance of part of an alternating current energized winding; and Fig. 5 illustrates the application of the circuit of Fig. 1 to measure the resistance of part of an alternating current energized winding.

Referring now to Fig. 1, there is shown a source of alternating current, indicated as lines 1 and 2 connected to a transformer 3 having a primary winding 4 to which the lines 1 and 2 are connected and a secondary winding 5 to which lines 6 and 7 are connected. A load generally identified as 8, such as the stator winding 9 of a motor having terminals 10 and 11, is energized from the secondary winding 5 of transformer 3.

In order to continuously measure the electrical resistance of the load winding 9 without deenergizing the circuit, the arrangement now to be described is provided. A transformer, generally identified as 12, is provided having a primary winding 13 adapted to be connected across terminals 14 and 15 which are connected to the lines 6 and 7. The secondary winding 16 of the transformer 12 is arranged with one end 17 connected to terminal 14 which in turn is connected to terminal 10 on one side of the load winding 9. The transformer 12 is arranged so that a voltage is developed across the secondary winding 16 which is substantially equal to the voltage across the load winding 9. A resistance measuring device 18, shown here as a Wheatstone bridge, is provided having one terminal 19 connected to the other end 20 of the transformer secondary winding 16 and another terminal 21 connected to terminal 22 which in turn is connected to terminal 11 on the other side of the load winding 9. A blocking capacitor 23 is arranged in series with terminal 11 of the load winding 9 intermediate the points of connection of the primary winding 13 with the terminal 15 at 24 and the bridge terminal 21 with the terminal 22.

In order to measure the electrical resistance of an alternating current energized winding with a bridge or ohmmeter, it is necessary to arrange the circuit so that substantially no alternating current voltage appears across the bridge or ohmmeter to prevent damage to the instrument. Furthermore, it is necessary to arrange the circuit so that the resistance measuring device does not also measure the resistance of all other loads which may be on the line with the winding to be measured. In order to arrange for cancelling out the alternating current voltage in so far as the resistance measuring device is cancelled, the transformer secondary winding 16 is arranged so that the voltage at the end 20 is substantially equal to the voltage at the terminal 11 of the load winding 9, i. e. so that the voltage developed thereacross is substantially equal to and 180° out of phase with the voltage across the load winding 9 with respect to the circuit comprising the transformer secondary winding 16, the load winding 9, and the bridge 18. Thus, it will be readily apparent that substantially no alternating current voltage will appear across the terminals 20 and 22 to which the terminals 19 and 21 of the bridge 18 are connected. Therefore, substantially no alternating current voltage appears across the bridge and the bridge will measure the electrical resistance across the terminals 20 and 22 without damage to the instrument. If no other means were provided, the bridge 18 would measure not only the resistance of the load winding 9, but also the resistances of the transformer secondary winding 16, the transformer primary 13, and the secondary winding 5 of the transformer 3. However, the provision of the capacitor 23 blocks direct current from the transformer primary winding 13 and the circuit to which the load winding 9 is connected so that the bridge 18 measures only the resistance of the load winding 9 and the transformer secondary winding 16. It will be readily apparent that the resistance of the transformer secondary winding 16 can be accurately measured in advance and, therefore, the bridge 18 can be calibrated to read the resistance of the load winding 9 directly.

In order to obtain highly accurate resistance measurements utilizing the circuit of Fig. 1, it has been found desirable to provide a transformer 12 with a secondary winding 16 having less resistance than the resistance to be measured. In the testing of stator windings of fractional horsepower motors, a secondary winding resistance of one-quarter to one-half ohm was found to be suitable. Furthermore, it has been found desirable to provide as large a capacitor 23 as possible so that the voltage drop thereacross is small since it will be readily apparent that this voltage drop appears across the bridge 18. A capacitor having on the order of 15,000 mfd. or an impedance of approximately 0.2 ohm at 60 cycles was found to be suitable. With load resistances as high as 10 ohms, this resistance of the capacitor 23 will give an error in the measurement of the load resistance of less than 0.01%.

Two methods may be used to eliminate the slight change in resistance of the secondary winding 16 of the transformer 12 which may result from the heating caused by no-load losses. The first method is to permit the transformer 12 to be energized until its temperature and resistance have stabilized before energizing the load winding 9. This procedure permits continuous resistance readings. The second method is to energize the transformer 12 only when a resistance reading is desired and to accomplish this, a double pole single throw switch 25 may be provided connecting the primary winding 13 and secondary winding 16 to the terminals 14.

Referring now to Fig. 2, in which like elements are indicated by like reference numerals, there is shown the application of the circuit of Fig. 1 to measure the resistance of an alternating current energized winding from which power is flowing such as on alternator or transformer secondary winding 26. In this case, the terminals 27 and 28 of the source winding 26 are connected to the terminals 14 and 22 and the terminals 29 and 30 of the load 31 are connected to the terminals 14 and 15.

Referring now to Fig. 3 in which like elements are also indicated by like reference numerals, there is shown a circuit utilizing a low pass filter circuit 32 instead of the transformer 12 of Figs. 1 and 2. Here the filter circuit is shown as comprising a series connected reactance 33 and filter capacitor 34 arranged across the terminals 14 and 22. In this circuit, the values of the reactance 33 and filter capacitor 34 must be relatively large so that there is substantially no voltage across the filter capacitor 34 and so that the resonant frequency of the filter circuit is substantially below the frequency of the alternating current energizing voltage. As can be seen, the bridge 18 has one terminal 21 connected to terminal 22 which is connected to terminal 11 of the load winding 9 and its other terminal 19 connected at a point 35 intermediate the reactance 33 and filter capacitor 34. Since substantially no voltage will appear across the capacitor 34, substantially all of the voltage appearing across the terminals 10 and 11 of the load winding 9 will appear across the reactance 33 so that substantially no alternating current voltage appears across the terminals 22 and 35 of the bridge 18. As in the embodiments of Figs. 1 and 2, capacitor 23 is provided in series with the terminal 11 of load winding 9 to block direct current from the circuit to which the load winding 9 is connected so that the bridge 18 measures only the resistance of the load winding 9 and the known resistance of the reactor 33. It was found in the measuring of resistance of stator windings of fractional horsepower motors that a capacitance on the order of 1800 mfd. was satisfactory for the filter capacitor 34 and an inductance of approximately two henries was satisfactory for the reactor 33 thus the resonant frequency of the filter circuit 32 is approximately 4 cycles per second which is well removed from the normal line frequency of 60 cycles. A fuse 36 is provided in series with the filter 32 to protect the circuit in the event of resonance between the filter capacitor 34 and the load inductance 9. A switch 37 is also provided to disconnect the measuring circuit.

Referring now to Fig. 4 in which like elements are also indicated by like reference numerals, there is shown the adaptation of the circuit of Fig. 3 to measure the resistance of any part of a series of alternating current energized windings 38, the particular part to be measured being identified as 39. Here, the reactance 33 is arranged in series between the side 40 of the winding 39 and the terminal 19 of the bridge 18. The side 41 of the load winding 39 is connected directly to terminal 21 of the bridge 18 and the filter capacitor 34 is connected between the end 35 of the reactance 33 and the terminal 22 which in turn is connected to the terminal 21 of the bridge 18. The protective fuse 36 and the blocking capacitor 23 are provided for the purposes described above. Analysis of the circuit of Fig. 4 will show it to be identical with the circuit of Fig. 3. It will also be readily apparent that the circuit of Fig. 1 may also be utilized to measure the resistance of part of an alternating current winding, as shown in Fig. 4, in which like elements are indicated by like reference numerals. Here since blocking capacitor 23 blocks direct current from the primary winding 13 of transformer 12 only, it is necessary to provide an additional blocking capacitor 42 in series with the load 38 to block direct current from the unmeasured portion of the load winding and the transformer secondary 5.

It will now be readily apparent that this invention provides an inexpensive and convenient means for continuously measuring the electrical resistance of an alternating current energized apparatus, either source or load, without the necessity for deenergizing the apparatus. This circuit permits determining the winding temperature of alternating current energized windings by measuring the resistance while the winding is energized.

While I have illustrated and described a particular embodiment of this invention, modifications thereof will occur to those skilled in the art. I desire it to be understood, therefore, that this invention is not to be limited to the particular arrangement disclosed, and I intend in the appended claims to cover all modifications which do not depart from the spirit and scope of the invention.

What I claim as new and desire to secure by Letters Patent of the United States is:

1. A circuit for measuring the resistance of energized alternating current apparatus comprising means adapted to have an alternating current voltage developed thereacross substantially equal to the voltage across said apparatus and adapted to have an end thereof connected to one side of said apparatus, means for measuring resistance adapted to be connected across the other end of said first-mentioned means and the other side of said apparatus, said first-mentioned means being arranged so that the voltage developed thereacross is substantially 180 degrees out of phase with the voltage across said apparatus with respect to the circuit comprising said first-mentioned means and said apparatus and said resistance-measuring means whereby substantially no alternating current voltage appears across said resistance measuring means, and direct current blocking means adapted to be arranged in circuit with said apparatus for blocking direct current from the circuit to which said apparatus is connected whereby said resistance measuring means measures only the resistance of said apparatus and said first-mentioned means.

2. A circuit for measuring the resistance of energized alternating current apparatus comprising means adapted to have an alternating current voltage developed thereacross substantially equal to the voltage across said apparatus and having one end adapted to be connected to one side of said apparatus, resistance measuring means having one terminal connected to the other end of said first-mentioned means and another terminal adapted to be connected to the side of said apparatus, said first-mentioned means being arranged so that the voltage developed thereacross is substantially 180° out of phase with the voltage across said apparatus with respect to the circuit comprising said first-mentioned means and said apparatus and said resistance measuring means whereby substantially no alternating current voltage appears across said resistance measuring means, and capacitor means adapted to be arranged in series with said apparatus remote from the point of connection of said resistance measuring means and said first-mentioned means whereby said resistance measuring means measures only the resistance of said apparatus and said first-mentioned means.

3. A circuit for measuring the resistance of energized alternating current apparatus comprising a transformer having a primary winding and a secondary winding adapted to have one end thereof connected to one side of said apparatus, said transformer being arranged so that a voltage substantially equal to the voltage across said apparatus is developed across said secondary winding, resistance measuring means having one terminal connected to the other end of said transformer secondary winding and another terminal adapted to be connected to the other side of said apparatus, said secondary winding of said transformer being connected so that the voltage thereacross is substantially equal to the voltage across said apparatus and substantially 180 degrees out of phase therewith with respect to the circuit comprising said secondary winding and said apparatus and said resistance-measuring means whereby substantially no alternating current voltage appears across said resistance measuring means, and capacitor means adapted to be arranged in circuit with said apparatus for blocking direct current from said transformer primary winding and the circuit to which said apparatus is connected whereby said resistance measuring means measures only the resistance of said apparatus and said transformer secondary winding.

4. A circuit for measuring the resistance of energized alternating current apparatus comprising a transformer having its primary winding adapted to be connected across the circuit to which said apparatus is connected, the secondary winding of said transformer having one end adapted to be connected to one side of said apparatus, resistance measuring means having one terminal connected to the other end of said transformer secondary winding and another terminal adapted to be connected to the other side of said apparatus, said transformer secondary winding being connected so that the voltage developed thereacross is substantially equal to the voltage across said apparatus and substantially 180° out of phase therewith with respect to the circuit comprising said transformer secondary winding and said apparatus and said resistance measuring means whereby substantially no alternating current voltage appears across said resistance measuring means, means for disconnecting said transformer primary and secondary windings from said apparatus, and capacitor means adapted to be arranged in series with said apparatus intermediate said transformer primary winding and said apparatus for blocking direct current from said transformer primary winding and the circuit to which said apparatus is connected whereby said resistance measuring means measures only the resistance of said apparatus and said transformer secondary winding.

5. A circuit for measuring the resistance of energized alternating current apparatus comprising a transformer having its primary winding adapted to be connected across the circuit to which said apparatus is connected, the secondary winding of said transformer having one end adapted to be connected to one side of said apparatus, resistance measuring means having one terminal connected to the other end of said transformer secondary winding and another terminal adapted to be connected to the other side of said apparatus, said transformer secondary winding being connected so that the voltage developed thereacross is substantially equal to the voltage across said apparatus and substantially 180° out of phase therewith with respect to the circuit comprising said transformer secondary winding and said apparatus and said resistance measuring means whereby substantially no alternating current voltage appears across said resistance measuring means, and capacitor means adapted to be arranged in series with said apparatus intermediate said transformer primary winding and said apparatus for blocking direct current from said transformer primary winding and the circuit to which said apparatus is connected whereby said resistance measuring means measures only the resistance of said apparatus and said transformer secondary winding.

6. A circuit for measuring the resistance of energized alternating current apparatus comprising a filter including a reactance and a capacitor adapted to be connected across said apparatus, said filter being arranged so that its resonant frequency is substantially different from the frequency of the alternating current energizing said apparatus, resistance measuring means having one terminal connected intermediate said reactor and said filter capacitor and another terminal adapted to be connected to the side of said apparatus to which said filter capacitor is adapted to be connected intermediate said side of said apparatus and said point of connection of said filter capacitor, said reactor being connected so that the voltage thereacross is substantially 180° out of phase with the voltage across said apparatus with respect to the circuit comprising said reactor and said apparatus and said resistance measuring means whereby substantially no alternating current voltage appears across said resistance measuring means, and capacitor means adapted to be arranged in circuit with said apparatus remote from said filter for blocking direct current from the circuit to which said apparatus is connected whereby said resistance measuring means measures only the resistance of said apparatus and said reactor.

7. A circuit for measuring the resistance of energized alternating current apparatus comprising a filter including a series arranged reactor and capacitor adapted to be connected across said apparatus, said filter being arranged so that its resonant frequency is substantially different from the frequency of the alternating current voltage impressed on said apparatus, resistance measuring means having one terminal connected intermediate said reactor and said filter capacitor and another terminal adapted to be connected to the side of said apparatus to which said filter capacitor is adapted to be connected intermediate said side of said apparatus and said point of connection of said filter capacitor, said reactor being arranged so that the voltage developed thereacross is substantially 180° out of phase with the voltage across said apparatus with respect to the circuit comprising said reactor and said apparatus and said resistance measuring means whereby substantially no alternating current voltage appears across said resistance measuring means, current limiting means arranged in series with said filter for limiting the current flow therethrough, and capacitor means arranged in circuit with said apparatus remote from said filter for blocking direct current from the circuit to which said apparatus is connected whereby said resistance measuring means measures only the resistance of said apparatus and said reactor.

RICHARD E. SEELY.

REFERENCES CITED

The following references are of record in the file of this patent:

UNITED STATES PATENTS

| Number | Name | Date |
| --- | --- | --- |
| 2,008,857 | Flanders | July 23, 1935 |
| 2,457,997 | George | Jan. 4, 1949 |
| 2,471,105 | Gustafsson et al. | May 24, 1949 |
| 2,473,495 | Webber | June 14, 1949 |